US009654456B2

(12) United States Patent
Maes (10) Patent No.: US 9,654,456 B2
(45) Date of Patent: May 16, 2017

(54) SERVICE LEVEL DIGITAL RIGHTS MANAGEMENT SUPPORT IN A MULTI-CONTENT AGGREGATION AND DELIVERY SYSTEM

(75) Inventor: Stephane H. Maes, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 2298 days.

(21) Appl. No.: 11/357,652

(22) Filed: Feb. 16, 2006

(65) Prior Publication Data
US 2007/0203841 A1    Aug. 30, 2007

(51) Int. Cl.
*H04L 29/06* (2006.01)

(52) U.S. Cl.
CPC .............. *H04L 63/08* (2013.01); *H04L 63/10* (2013.01); *H04L 63/104* (2013.01); *H04L 63/168* (2013.01); *H04L 2463/101* (2013.01)

(58) Field of Classification Search
CPC ........................................................ H04L 63/08
USPC ....................................................... 705/50–79
See application file for complete search history.

(56) References Cited

U.S. PATENT DOCUMENTS

| 5,260,999 | A | * | 11/1993 | Wyman | 705/59 |
| 5,629,980 | A | * | 5/1997 | Stefik et al. | 705/54 |
| 5,765,152 | A | * | 6/1998 | Erickson | |
| 5,857,020 | A | * | 1/1999 | Peterson, Jr. | 705/52 |
| 5,910,987 | A | * | 6/1999 | Ginter et al. | 705/52 |
| 5,933,498 | A | * | 8/1999 | Schneck et al. | 705/54 |
| 5,935,249 | A | * | 8/1999 | Stern | H04L 63/08 726/21 |
| 6,189,146 | B1 | * | 2/2001 | Misra | G06F 21/105 705/59 |
| 6,226,618 | B1 | * | 5/2001 | Downs et al. | 705/1 |
| 6,385,596 | B1 | * | 5/2002 | Wiser et al. | 705/51 |
| 6,389,541 | B1 | * | 5/2002 | Patterson | 726/9 |

(Continued)

FOREIGN PATENT DOCUMENTS

WO    WO 2006060822 A2 *    6/2006

OTHER PUBLICATIONS

White, "How Computers Work", Millennium Edition, 1999, Que Corporation, Indianapolis, IN, all pages.*

(Continued)

*Primary Examiner* — Jacob C. Coppola
(74) *Attorney, Agent, or Firm* — Kilpatrick Townsend & Stockton LLP (57) ABSTRACT

Content may be provided to an access device by the content delivery platform. When the access device decides to access the content, a request may be received at the content delivery platform. The request is intercepted at a URL proxy, which determines if the content has been purchased or not. If the content has been purchased, the request is redirected to a digital rights server. The digital rights server processes the request and determines digital rights for the content using the address. The digital rights are then provided such that the access device can access the content. If a user of the access device has not already purchased the content, a message may be sent to the access device requesting that the user purchase the content. Once the content is purchased, the digital rights are then provided such that the access device can access the content.

21 Claims, 5 Drawing Sheets

(56) References Cited

U.S. PATENT DOCUMENTS

| | | | |
|---|---|---|---|
| 6,567,857 B1* | 5/2003 | Gupta et al. | 709/238 |
| 6,993,137 B2* | 1/2006 | Fransdonk | 380/279 |
| 7,003,572 B1* | 2/2006 | Lownsbrough et al. | 709/227 |
| 7,039,615 B1* | 5/2006 | Gajjala et al. | 705/59 |
| 7,209,892 B1* | 4/2007 | Galuten et al. | 705/26.62 |
| 2002/0082997 A1* | 6/2002 | Kobata et al. | 705/51 |
| 2002/0108049 A1* | 8/2002 | Xu | H04L 63/102 705/59 |
| 2002/0124055 A1* | 9/2002 | Reisman | 709/218 |
| 2003/0079133 A1* | 4/2003 | Breiter et al. | 713/182 |
| 2003/0108018 A1* | 6/2003 | Dujardin et al. | 370/338 |
| 2004/0221179 A1* | 11/2004 | Seshadri | H04L 63/083 726/15 |
| 2006/0041421 A1* | 2/2006 | Ta | G06F 21/10 704/5 |
| 2006/0122941 A1* | 6/2006 | Coley et al. | 705/59 |
| 2006/0129809 A1* | 6/2006 | Battagin | G06F 21/6209 713/166 |
| 2006/0136339 A1* | 6/2006 | Kim | G06F 21/10 705/51 |
| 2006/0143686 A1* | 6/2006 | Maes | G06F 21/6218 726/1 |
| 2006/0200797 A1* | 9/2006 | Grasselt | G06Q 10/06 717/107 |
| 2007/0011437 A1* | 1/2007 | Carnahan | G06F 9/4436 712/200 |
| 2007/0022306 A1* | 1/2007 | Lindsley | G06F 21/10 713/193 |
| 2007/0130078 A1* | 6/2007 | Grzesek | G06F 21/10 705/59 |
| 2007/0203841 A1* | 8/2007 | Maes | 705/52 |
| 2007/0289006 A1* | 12/2007 | Ramachandran et al. | 726/10 |
| 2008/0189401 A1* | 8/2008 | Maes | G06Q 10/00 709/223 |

OTHER PUBLICATIONS

Derfler, "How Networks Work," Bestseller Edition, 1996, Ziff-Davis Press, Emeryville, CA, all pages.*

Gralla, "How the Internet Works," Millennium Edition, 1999, Que Corporation, Indianapolis, IN, all pages.*

Muller, "Desktop Encyclopedia of the Internet," 1999, Artech House Inc., Norwood, MA, all pages.*

* cited by examiner

SERVICE LEVEL DIGITAL RIGHTS MANAGEMENT SUPPORT IN A MULTI-CONTENT AGGREGATION AND DELIVERY SYSTEM

BACKGROUND OF THE INVENTION

Embodiments of the present invention generally relate to telecommunications and more specifically to techniques for providing digital rights management for a content delivery platform at the service level.

A content delivery platform may be used to deliver multi-types of content through multi-channels. The content delivery platform provides ways for monetizing the content, i.e., content providers can charge for the purchase and download of content. Thus, users may purchase the content, which is then delivered to a device.

The owners of the content may wish to provide digital rights management to protected content. Digital rights management may protect the owner by only allowing authorized users to play the content (typically users that have purchased the content). Various digital rights management techniques may be used, such as public key encryption or digital certificates. These techniques, however, do not take into account whether the content was purchased or not. Further safeguards may be needed for digital rights when content delivery is monetized in a business.

BRIEF SUMMARY OF THE INVENTION

Embodiments of the present invention generally relate to providing digital rights management at the service level for a content delivery platform.

In one embodiment, content may be provided to an access device by the content delivery platform. When the access device decides to access the content, it may not have the necessary rights. It can generate a request for the rights that may be received at the content delivery platform (based on content meta data—e.g., a silent header). The request may be sent to an address (e.g., a uniform resource locator/identifier (URL/URI) that points to the content. In one embodiment, the request is intercepted at a URL proxy, which determines if the content has been purchased or not (or any other criteria that determines entitlement to the content). If the content has been purchased (i.e., the access device should be allowed to access the content), the request is redirected to a digital rights server to obtain the rights. The digital rights server processes the request and determines digital rights for the content using the address. The digital rights are then provided such that the access device can access the content.

If a user of the access device has not already purchased (not yet entitled to it) the content, a message may be sent to the access device requesting that the user purchase the content. For example, the request may be a menu that allows the access device to interact with a digital asset manager in order to purchase the content. Once the content is purchased, the request may be redirected to a digital rights server, which can then determine the digital rights for the content. The digital rights are then provided such that the access device can access the content.

If an access device does not find where to get the rights (e.g., a URL is not provided with the content), the access device may search for the rights via a request to a service provider that indicates a request for rights for the content. The search may be automatically re-directed as described above or may provide results that allow a user to browse the results and find the appropriate rights.

In one embodiment, a method for providing digital rights management at a service level is provided. The method comprises: providing content to an access device from a content delivery platform; receiving a request that the access device desires access to the content, the request sent to an address for the content delivery platform; determining if the access device has properly purchased the content; if the access device has properly purchased the content, performing the steps of: redirecting the request to a digital rights server; processing the request, at the digital rights server, to determine digital rights for the content using the address used in the request; and providing the digital rights to the user such that the access device can access the content.

In another embodiment, a method for providing digital rights management at a service level is provided. The method comprises: providing content to an access device from a content delivery platform, wherein the content is not purchased; receiving a request that the access device desires access to the content; determining that the content was not purchased by the access device; sending a message to the access device requesting the access device purchase the content; receiving a confirmation that the access device has purchased the content; redirecting the request to a digital rights server; processing the request, at the digital rights server, to determine digital rights for the content using the address used in the request; and providing the digital rights to the user such that the access device can access the content.

A further understanding of the nature and the advantages of the inventions disclosed herein may be realized by reference of the remaining portions of the specification and the attached drawings.

DETAILED DESCRIPTION OF THE INVENTION

Embodiments of the present invention provide digital rights management for the content downloaded by an access device. The digital rights management is provided at the service level. Digital rights management may be provided using a content delivery platform. The content delivery platform is described and then techniques for digital rights management are described thereafter. Although the content delivery platform is described, it will be understood that other platforms may be used.

Content Delivery Platform

Figure 1:
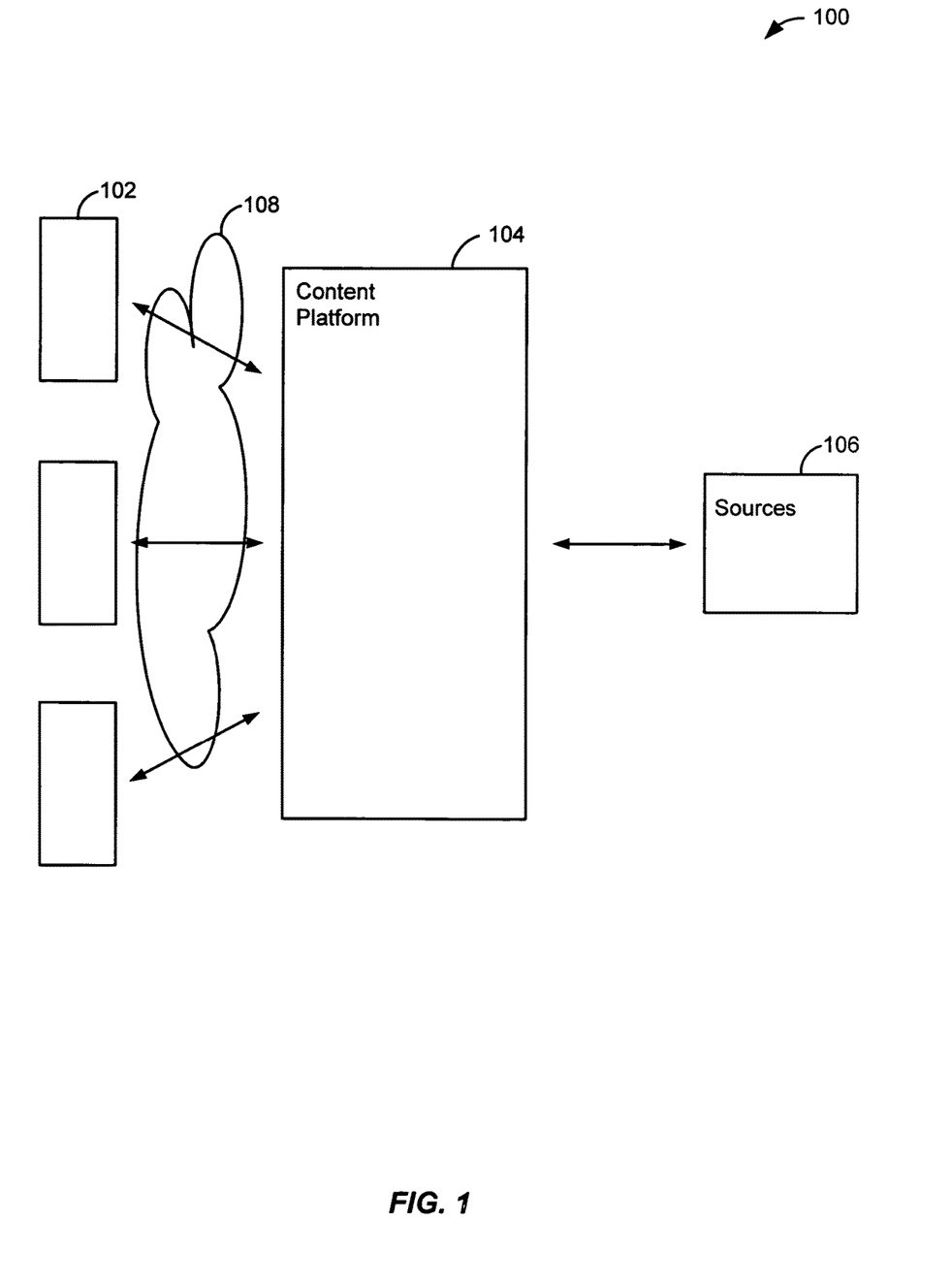
FIG. 1 depicts a system for managing content according to one embodiment of the present invention.

FIG. 1 depicts a system 100 for managing content according to one embodiment of the present invention. In one embodiment, system 100 includes one or more access devices 102, a content delivery platform 104, and sources 106.

Access devices 102 include any devices that can send messages through access channels. An access channel is a channel in which messages of a certain format or protocol may be sent. For example, the messaging formats may be short message service (SMS), multimedia messaging service (MMS), voice, email, instant message (IM), facsimile, HyperText Transfer Protocol (HTTP), etc. In one example, SMS messages may be sent through an SMS access channel. Also, MMS messages may be sent through an MMS access channel and HTTP messages may be sent through the Internet. Each access channel may require a different protocol or format in order to send the messages through the channel.

Access devices 102 may include cellular phones, personal digital assistants (PDAs), personal computers, workstations, fax machines, plain old telephone service (POTS) telephones, etc. Access devices 102 are configured to send messages through access channels. For example, an SMS device sends messages through an SMS channel. Also, an access device 102 may be configured to send messages through multiple access channels. For example, a cellular phone may be configured to send SMS and MMS messages through SMS and MMS access channels.

Content delivery platform 104 is configured to provide content to access devices 102. Content may be provided from external sources 106 or from content stored locally to messaging server 104. Examples of content may include any information. For example, content may be multimedia information, videos, data, television programs, audio information, etc.

Sources 106 may be any entities that provide content. For example, sources 106 may be content providers that may make content available through platform 104.

Figure 2:
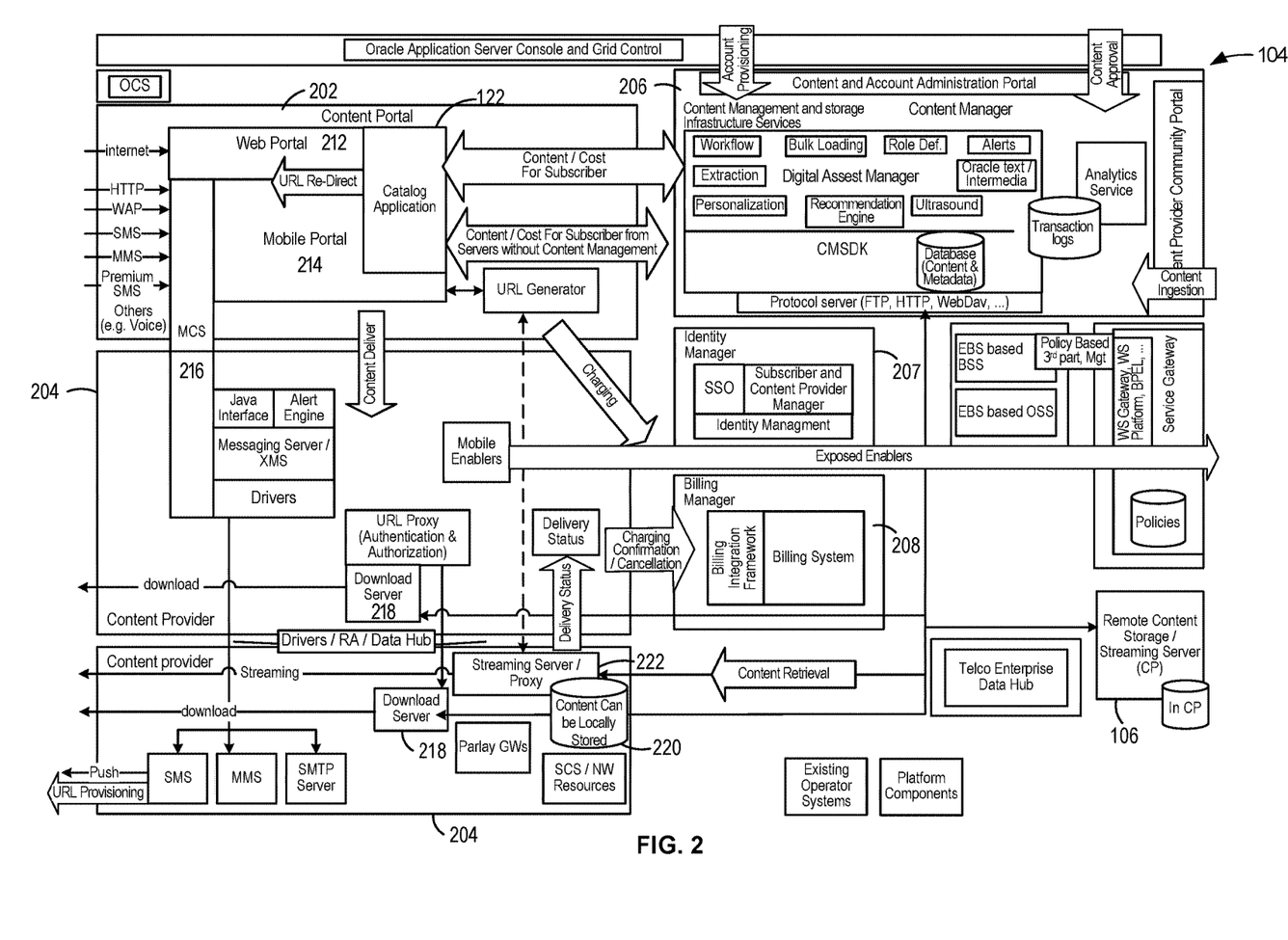
FIG. 2 depicts a more detailed embodiment of content delivery platform according to one embodiment of the present invention.

FIG. 2 depicts a more detailed embodiment of content delivery platform 104 according to one embodiment of the present invention. As shown, content delivery platform 104 includes a content portal 202, a delivery service module 204, a content manager 206, an identity manager 207, a billing manager 208, and a network gateway 210.

Content portal 202 is configured to receive messages from messaging devices and requests from access devices 102 through one or more access channels. For example, portal 202 may be configured to receive messages using hypertext transfer protocol (HTTP), wireless application protocol (WAP), short message service (SMS), multimedia message service (MMS), premium SMS, voice, HTTP, etc.

As shown, a portal is provided to process different messaging types. For example, a web portal 212 is provided to receive and send messages using HTTP through the Internet. A mobile portal 214 is provided to receive messages through WAP, SMS, MMS, and premium SMS. Additionally, a multi-channel server (MCS) 216 is provided that can send messages across multiple access channels and also adapt content to different access channels. Details of a MCS are provided in U.S. patent application Ser. No. 10/684,686, entitled "Intelligent Messaging", filed Oct. 13, 2003, which is hereby incorporated by reference in its entirety for all purposes.

Portal 202 enables a user to browse available content that may be provided to the user. A user may preview the content and eventually order the content by sending messages through portal 202. The user may browse and access content through any number of access channels that are compatible with portal 202.

Content provider 204 is configured to provide content to access devices 102. The content may be provided using a download server 218. The content may be stored, downloaded or streamed locally or remotely. 1 For example, the content may be received from a remote source 106 and stored in a storage device 220 (which can be local or remote). After which, content may be downloaded through download server 218.

The content may also streamed from source 106. In this case, the content may be streamed through a streaming server/proxy 222 to access devices 102. In another embodiment, the content may be stored in storage device 220 and then downloaded to access devices 102.

Content manager 206 is configured to provide management tools for the content. For example, content manager 206 is used to determine device requirements (i.e., what content is suitable/OK for a particular device), description requirements (e.g. what a device requires to be usable/viewable . . . ), pricing, whether content should be previewed (how often should it be allowable), categorization of content, any relevant metadata useful to help (e.g., details on contact information for prior to buying, links to contact to preview, categories and keywords for content to related content (and recommend/associate to user), conditions for viewing, how long to make the content available, pointers to DRM rights, how to transform/adapt content for a device, information on whether the content provider is authorized to adapt, what access device 102 content manager 206 explicitly supports, what devices 102 may be a problem, etc. For example, in determining which content should be provided to an access device 102, content manager 206 uses metadata associated with the user and content to determine how to format the content. In one example, the metadata may indicate that a user is using a device that is configured to receive SMS messages. The content may then be sent in a series of SMS messages (or ring tones).

Content manager 206 also provides business intelligence for a user that may be used to improve sales, provide recommendations (based on purchase patterns, user preferences), determine success of the content, etc.

Identity manager 207 is configured to determine an identity of a user and profile details of the user/subscriber. A user's identity may be determined based on a user identifier provided with a message sent to messaging portal 202. For example, the user may be identified using a user name and password, a cookie, an identifier, such as a phone number, that is used to send the message, etc. Thus, identity manager 207 is configured to determine a user that sent a message.

Additional information stored for a user may be what the user has previously purchased, what content the user has subscribed to, patterns of purchases that can be used for recommendations, transactions identifiers to previous transactions. Also, information on user identifiers for access devices 102, what devices the user uses, the access channels, permissions, and other user preferences may be stored. Identity manager 207 also supports single sign-on for content from sources 106.

Billing manager 208 is configured to manage the billing for content provided to a user. For example, the content may be provided based on a prepaid or postpaid model. The prepaid model is where a user prepays a certain amount for content. When content is provided to the user, the prepaid account may be debited by the amount charged for the content. With the postpaid method, billing manager 208 is configured to provide the content and then charge the user.

Digital rights management as described below may be used to ensure that proper payment for the content downloaded is received.

Billing manager 208 is configured to access a user's checking account to debit money for delivered content, reserve an amount of money for a user, bill an amount of money, etc. Also, billing manager 208 is configured to receive confirmation for any actions taken for the billing and store the confirmation or send it to the user.

Billing manager 208 can also cancel a billed amount of money (e.g., based on the amount and a transaction ID), allow the cancellation of a reserved amount of money (e.g., based on the amount and a transaction ID), and confirm a reservation of money (e.g., based on the amount and a transaction ID). Also, billing manager 208 can correct a bill (refund a charge) if delivery failed or a user complained about delivery.

The delivery status of the content may be determined in multiple ways and used to determine if a user should be billed for content. For example, commands may be sniffed when content is streamed to an access device 102 and used to determine a delivery status for content.

Also, if content is downloaded through a download server, if all the content is downloaded may be used to determine a delivery status. For an HTTP/FTP request, it can be checked if access was allowed or the content was downloaded. Also, billing manager 208 can determine if there were any error messages, deliver statistics, or any other indications of errors while delivering the content.

Because platform 104 is managing content for a plurality of sources 106, billing manager 208 may bill or send money to sources 106 when their content is downloaded by a user. Billing manager 208 is configured to manage the relationship and allow revenue sharing between the service provider and sources 106.

Additional detailed for content delivery platform 104 are described in U.S. patent application Ser. No. 11/138,844, entitled "PLATFORM AND SERVICE FOR MANAGEMENT AND MULTI-CHANNEL DELIVERY OF MULTI-TYPES OF CONTENTS", filed May 25, 2005, which is hereby incorporated by reference for all purposes (hereinafter referred to as the '844 application).

Digital Rights Management

Figure 3:
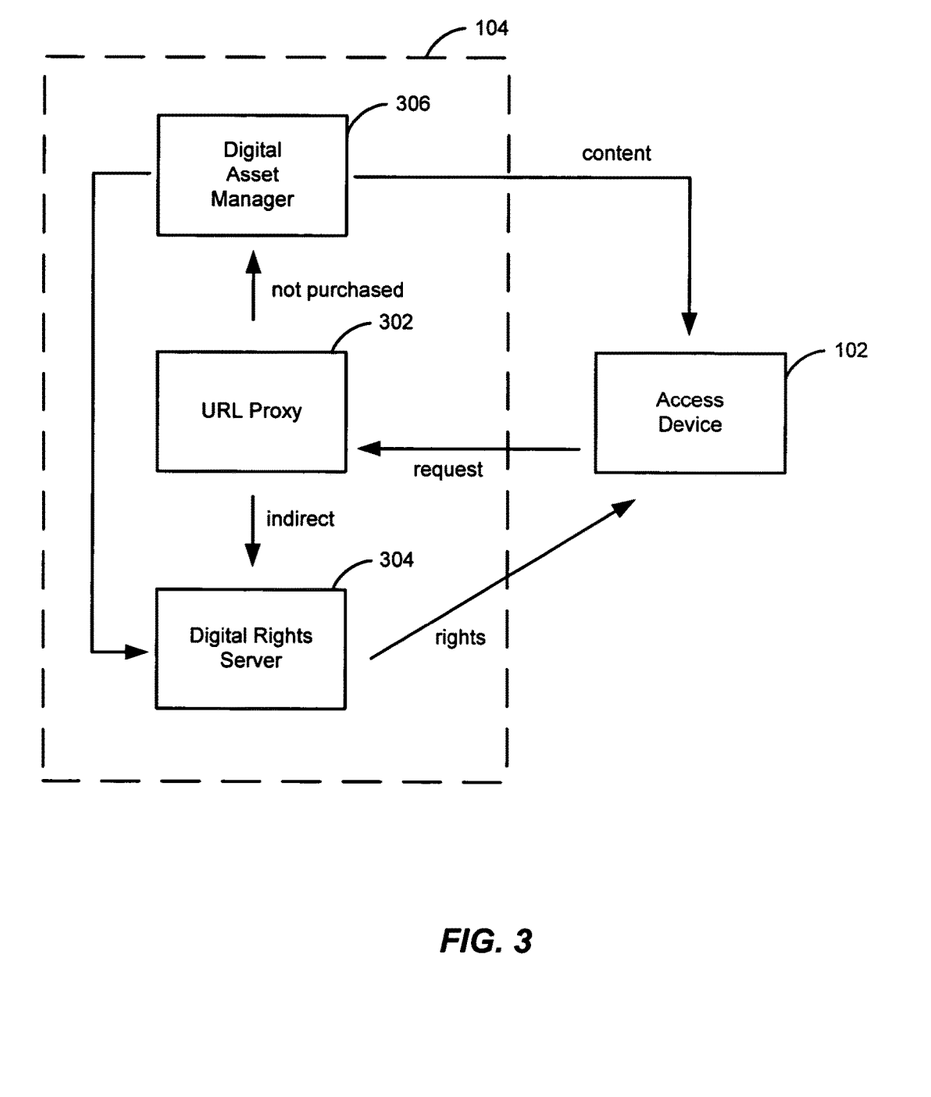
FIG. 3 depicts a system for providing digital rights management at the service level according to one embodiment of the present invention.

FIG. 3 depicts a system 300 for providing digital rights management at the service level according to one embodiment of the present invention. As shown, a simplified content delivery platform 104 includes a URL proxy 302, a digital rights server 304, and a digital asset manager 306. An access device 102 is used to request content and digital rights. Although digital rights server 304 is shown as part of platform 104, it will be understood that it may be separate from the platform (e.g., outside the domain of the service provider).

Digital rights management is provided at the service level. As downloaded content is provided for monetary or other considerations, digital rights management needs to be provided at the service level. The DRM function is provided as a service. That is, DRM rights can be requested, delivered, and used by the applications or access devices. Digital rights are treated as content that can be accessed if entitled to by a user.

The content may be pre-purchased at the time content is downloaded or may be purchased at a later time. Also, content may also be distributed by another user/access device (or same user to another device) with schemes for copying or super distribution, etc.

When content is downloaded by access device 102, the content may be provided with rights (packaged together). The digital rights may be any rights that are needed to allow access to content. A person skilled in the art will appreciate different types of digital rights.

The content may not be accompanied by the DRM rights but contain information about the rights. For example, an identifier, such as a uniform resource locator (URL) or uniform resource identifier (URI), is provided as a pointer to the rights. The identifier may be referred to as a URL hereinafter but it will be understood that any information about the rights may be provided for the content. The URL may be provided in the content, such as in a silent header or in any other part of the content.

As mentioned above the content may be pre-purchased (purchased before trying to play/use it) or purchased after download (i.e., it is on the device—downloaded for free or received via copy, super distribution, etc.). In one embodiment, different methods may be used depending on if the content was purchased or not. These methods may be implemented using Business Process Execution Language (BPEL) or any other language. For example, the flow using the URL proxy and functions of digital asset manager 306 can be done by BPEL in one embodiment.

Pre-Purchase of Content/Content Obtained without Rights

Upon reception of pre-purchased content, access device 102 may send a request to the address found in the URL. In one embodiment, the address is to URL proxy 302 of content delivery platform 104. In one embodiment, the address that the URL points to is a different address than an address to digital rights server 304. This provides extra security in that access device 102 cannot know where the digital rights for the content are stored. Thus, the URL may not be used to gain unauthorized access to the rights.

URL proxy 302 is configured to intercept the request sent to the URL. URL proxy 302 then checks if access device 102 (or a user) is authorized to access the rights for the content. For example, it may be determined if the content was successfully purchased (e.g., by a user or access device 102) by looking at the user/subscriber profile/management enabler (identity management box). Further details of determining if the content was successfully purchased are described in the '844 application. URL proxy 302 may confer with an identity management module to determine if the content was properly purchased. For example, records may indicate which content the user/access device has purchased. It may also confer in some embodiments with digital asset manager 306 to determine which content has been purchased and by whom (this info may be also useful for personalization in delivering rights to access device 102).

If it is determined that the content was successfully purchased, the request is redirected to digital rights server 304. Digital rights server 304 is then configured to determine the rights for the content. The rights may be determined based on the URL that is sent in the request. For example, the URL may be stored with the proper rights in digital rights server 304.

In one embodiment, digital rights server 304 uses Rights Object Acquisition Protocol (ROAP) to provide the digital rights. Upon successful completion of the protocol, a rights object may be created by digital rights server 304. This rights object includes the rights that are needed in order to access the content. Digital rights server 304 then sends the rights object to access device 102.

Access device 102 can then access the content once it receives the rights object.

Figure 4:
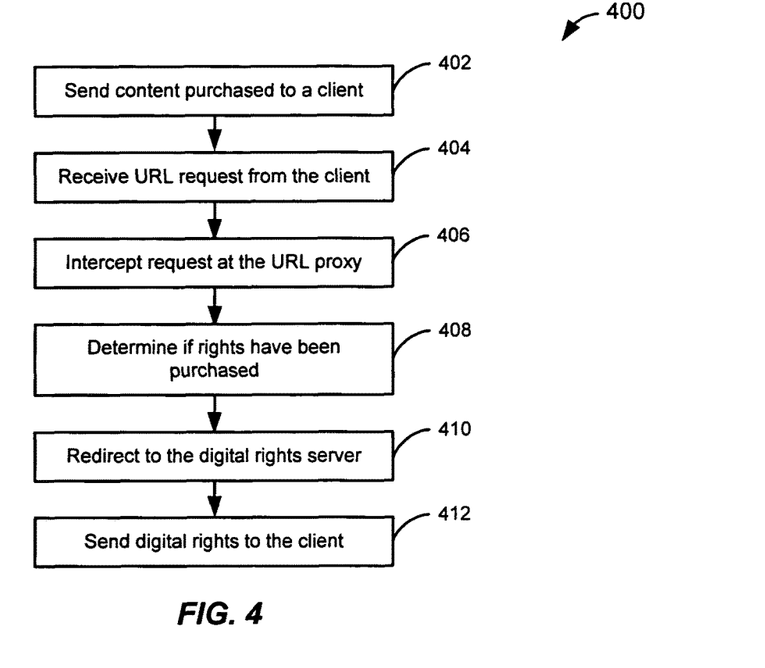
FIG. 4 depicts a simplified flowchart of a method for providing digital rights according to one embodiment of the present invention.

FIG. 4 depicts a simplified flowchart 400 of a method for providing digital rights according to one embodiment of the present invention. In step 402, content delivery platform 104 sends content purchased to access device 102. This content has been pre-purchased. Also, the content includes a URL that may be used to secure rights to the content.

In step 404, content delivery platform 104 receives a URL request for the rights from access device 102. In step 406, the request is intercepted at URL proxy 302. An address for the URL is a different address from where the rights are being stored at digital rights server 304.

In step 408, it is determined if the rights have been purchased. If the rights have not been purchased, a message may be sent back to access device 102 indicating that the rights have not been purchased and also allows access device 102 to purchase the rights.

In step 410, if the rights have been purchased, the request is redirected to digital rights server 304.

In step 412, the digital rights are sent to access device 102 by digital rights server 304. Thus, the request may be sent to URL proxy 302 but digital rights server 304 is then used to send the rights to access device 102. Digital rights server 304 uses the URL to determine which rights should be sent to access device 102.

Purchase After Rights Request

Referring back to FIG. 3, if access device 102 had downloaded the content at zero cost (no purchase was needed or the content was distributed differently—copied, etc.), then content delivery platform 104 is configured to procure payment for the content before sending the rights to access device 102. When URL proxy 302 receives the request, it uses the URL to determine if content had been purchased. If not, digital asset manager 306 passes a page to portal 202 that presents it to a user on the access device 102 in order to procure purchase of the rights. Details for providing a page to a user are described in further detail in the '844 application.

In one embodiment, a menu may be sent to access device 102. The menu allows the user select which rights they want to purchase. Access device 102 then sends a request back to the service provider (via URL) for purchasing the rights. Any methods may be used to complete the purchase, such as using a credit card, crediting an account, etc. (additional details may be provided in the '844 application)

Once the purchase is secured, a browser/application on access device 102 is redirected (proxied) to digital rights server 304. The process then proceeds as described above in which the rights are sent/downloaded to access device 102 such that access device 102 can access/play the content.

Figure 5:
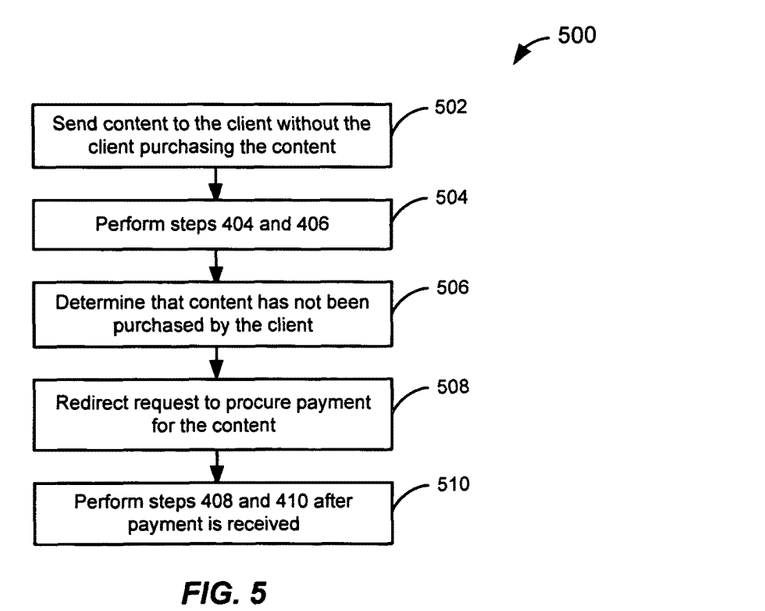
FIG. 5 depicts a simplified flowchart of a method for providing digital rights management according to an embodiment of the present invention.

FIG. 5 depicts a simplified flowchart 500 of a method for providing digital rights management according to an embodiment of the present invention. In step 502, content is sent to access device 102 without access device 102 purchasing the content. For example, the content is sent at zero cost and no purchase is needed (or it may be received differently based on copying, super distribution from another device or user, etc.).

In step 504, steps 404 and 406 are performed and a request is received for the content. However, in this case, the content has not been purchased and thus in step 506, it is determined that the content has not been purchased by access device 102. Embodiments of the present invention provide digital rights management at the service level and thus the rights for the content are not just provided. Rather, it is determined if the rights have been properly purchased. This ensures that proper compensation is received for the providing of the content.

In step 508, the request is redirected to a payment page that is configured to procure payment for the content. The payment may be by any methods, such as through a credit card, pay pal, etc.

Once payment is received, in step 510, steps 408, 410, and 412 of FIG. 4 are performed. This sends the rights to access device 102 after they have been purchased.

Content Upload

Content providers can also upload content to content delivery platform 104. Uploaded content is received from a content provider. Metadata may be used to call a workflow that packages the digitals rights for the content (at upload time or delivery time).

When uploading content, the meta data (passed by content provider who uploads content or pointers to content) may point to a URL for rights. When uploading or when delivering rights using digital asset manager 306, a workflow may be started. The workflow may package rights with content at upload (in DAM) or at delivery. Also, content may be stored remotely (e.g., at a content provider's site) and content and rights may be packaged in advance or dynamically at download.

Other Methods of Providing Rights

In other embodiments, content delivery platform 104 may package the rights with the content. Thus, when content is purchased and downloaded, the rights may be delivered with it. Also, in another embodiment, a workflow (using meta data) may be provided in which the workflow is used to determine where the rights are when the content is purchased. The workflow then packages the rights before delivery. The rights are then sent to access device 102 with the content.

Packaging the rights with the content in the beginning may be risky because unauthorized access to the content may allow the content to be stolen in addition to the rights. Thus, the content can be played because the rights have been stolen with the content. Also, using a workflow in order to package the rights with the content may require additional processing and also delay delivery.

Embodiments of the present invention provide many advantages. For example, digital rights are provided at the service level for the delivery of content and digital rights. A content delivery platform can then be used to monetize and provide content with digital rights. It can be ensured that rights for content downloaded are purchased by a user. Thus, the business of providing content and rights is secured. Further, the mechanism in which the rights are sent to access devices provides extra security. Thus, the unauthorized access of content is limited by embodiments of the present invention.

Figure 6:
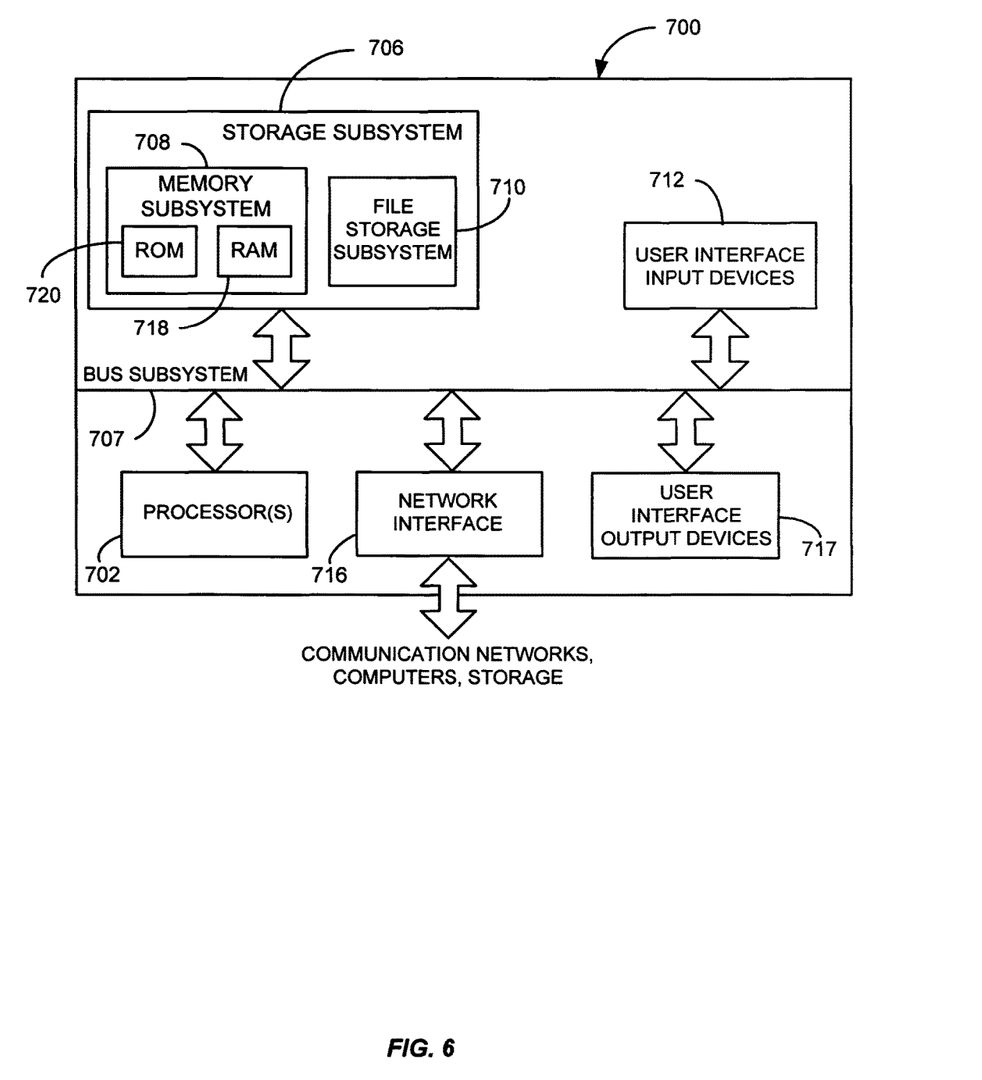
FIG. 6 is a simplified block diagram of data processing system that may be used to perform processing according to an embodiment of the present invention.

FIG. 6 is a simplified block diagram of data processing system 700 that may be used to perform processing according to an embodiment of the present invention. As shown in FIG. 6, data processing system 700 includes at least one processor 702, which communicates with a number of peripheral devices via a bus subsystem 704. These peripheral devices may include a storage subsystem 706, comprising a memory subsystem 708 and a file storage subsystem 710, user interface input devices 712, user interface output devices 714, and a network interface subsystem 716. The input and output devices allow user interaction with data processing system 702.

Network interface subsystem 716 provides an interface to other computer systems, networks, and storage resources.

The networks may include the Internet, a local area network (LAN), a wide area network (WAN), a wireless network, an intranet, a private network, a public network, a switched network, or any other suitable communication network. Network interface subsystem 716 serves as an interface for receiving data from other sources and for transmitting data to other sources from data processing system 700. Embodiments of network interface subsystem 716 include an Ethernet card, a modem (telephone, satellite, cable, ISDN, etc.), (asynchronous) digital subscriber line (DSL) units, and the like.

User interface input devices 712 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information to data processing system 700.

User interface output devices 714 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term "output device" is intended to include all possible types of devices and ways to output information from data processing system 700.

Storage subsystem 706 may be configured to store the basic programming and data constructs that provide the functionality of the present invention. For example, according to an embodiment of the present invention, software modules implementing the functionality of the present invention may be stored in storage subsystem 706. These software modules may be executed by processor(s) 702. Storage subsystem 706 may also provide a repository for storing data used in accordance with the present invention. Storage subsystem 706 may comprise memory subsystem 708 and file/disk storage subsystem 710.

Memory subsystem 708 may include a number of memories including a main random access memory (RAM) 718 for storage of instructions and data during program execution and a read only memory (ROM) 720 in which fixed instructions are stored. File storage subsystem 710 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 704 provides a mechanism for letting the various components and subsystems of data processing system 702 communicate with each other as intended. Although bus subsystem 704 is shown schematically as a single bus, alternative embodiments of the bus subsystem may utilize multiple busses.

Data processing system 700 can be of varying types including a personal computer, a portable computer, a workstation, a network computer, a mainframe, a kiosk, or any other data processing system. Due to the ever-changing nature of computers and networks, the description of data processing system 700 depicted in FIG. 7 is intended only as a specific example for purposes of illustrating the preferred embodiment of the computer system. Many other configurations having more or fewer components than the system depicted in FIG. 7 are possible.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for providing digital rights management at a service level, the method comprising:
   providing content to an access device from a content delivery platform, wherein the content is not accompanied by digital rights;
   providing information about digital rights for the provided content to the access device from the content delivery platform, wherein:
      the information about digital rights comprises an address of a URL proxy of the content delivery platform; and
      the information about digital rights is provided in the content in a silent header;
   receiving, at the content delivery platform, a request for digital rights, the request being related to the access device accessing the content previously provided to the access device from the content delivery platform, the request being generated by and sent from the access device to the address from the information about the digital rights previously provided to the access device from the content delivery platform;
   intercepting, by the URL proxy of the content delivery platform, the request;
   determining, by the URL proxy of the content delivery platform, that the access device is authorized to access the digital rights for the content;
   redirecting, by the URL proxy of the content delivery platform, the request as received from the access device from the content delivery platform to a digital rights server such that the access device does not know where the digital rights are stored;
   processing the request, at the digital rights server, to create a digital rights object for the content using the address of the URL proxy of the content delivery platform to which the request was sent, wherein the address of the URL proxy of the content delivery system is previously stored at the digital rights server; and
   providing the digital rights object from the digital rights server to the access device such that the access device can access the content by treating the digital rights object as content itself by the access device.

2. The method of claim 1, wherein the address of the URL proxy of the content delivery system to which the request was sent comprises a uniform resource locator (URL) or uniform resource identifier (URI).

3. The method of claim 1, wherein the content is provided to the access device when it is purchased by the access device.

4. The method of claim 1, further comprising:
   receiving an upload of the content from a content provider; and determining a workflow for the content, wherein the workflow allows meta data to be combined with the digital rights, the meta data used in processing the request.

5. The method of claim 4, wherein the address is added to a header of the request.

6. The method of claim 1, further comprising generating, by the content delivery platform, a business process workflow to handle the request.

7. A system comprising:
an access device;
a content delivery platform communicatively coupled with an access device and comprising a URL proxy, wherein the content delivery platform is configured to:
provide content to the access device, wherein the content is not accompanied by digital rights;
provide information about digital rights for the content to the access device, wherein:
the information about digital rights comprises an address of a URL proxy of the content delivery platform; and
the information about digital rights is provided in the content in a silent header;
receive a request for digital rights, the request being related to the access device accessing the content previously provided to the access device from the content delivery platform, the request being generated by and sent from the access device to the address from the information about the digital rights previously provided to the access device from the content delivery platform;
intercept, by the URL proxy of the content delivery platform, the request;
determine, by the URL proxy of the content delivery platform, that the access device is authorized to access the digital rights for the content; and
redirecting, by the URL proxy of the content delivery platform, the request as received from the access device to a digital rights server such that the access device does not know where the digital rights are stored; and
said digital rights server communicatively coupled with the content delivery platform, wherein the digital rights server is configured to:
process the request to create a digital rights object for the content using the address of the URL proxy of the content delivery system to which the request was sent, wherein the address of the URL proxy of the content delivery platform is previously stored at the digital rights server; and
provide the digital rights object to the access device such that the access device can access the content by treating the digital rights object as content itself by the access device.

8. The system of claim 7, wherein the address of the URL proxy of the content delivery system to which the request was sent comprises a uniform resource locator (URL) or uniform resource identifier (URI).

9. The system of claim 7, wherein the content delivery platform is further configured to generate a business process workflow to handle the request.

10. The system of claim 9, where the business process workflow comprises a Business Process Execution Language (BPEL) script.

11. The system of claim 9, where the business process workflow comprises a Business Process Execution Language (BPEL) script.

12. The system of claim 7, wherein the content is provided to the access device when it is purchased by the access device.

13. The system of claim 7, wherein the content delivery platform is further configured to:
receive an upload of the content from a content provider; and
determine a workflow for the content, wherein the workflow allows meta data to be combined with the digital rights, the meta data used in processing the request.

14. The system of claim 7, wherein the address is added to a header of the request.

15. A non-transitory, computer-readable medium comprising instructions that, when executed by one or more processors, cause the one or more processors to perform operations comprising:
providing content to an access device from a content delivery platform, wherein the content is not accompanied by digital rights;
providing information about digital rights for the provided content to the access device from the content delivery platform, wherein:
the information about digital rights comprises an address of a URL proxy of the content delivery platform; and
the information about digital rights is provided in the content in a silent header;
receiving, at the content delivery platform, a request for digital rights, the request being related to the access device accessing the content previously provided to the access device from the content delivery platform, the request being generated by and sent from the access device to the address from the information about the digital rights previously provided to the access device from the content delivery platform;
intercepting, by the URL proxy of the content delivery platform, the request;
determining, by the URL proxy of the content delivery platform, that the access device is authorized to access the digital rights for the content; and
redirecting, by the URL proxy of the content delivery platform, the request as received from the access device from the content delivery platform to a digital rights server such that the access device does not know where the digital rights are stored;
processing the request, at the digital rights server, to create a digital rights object for the content using the address of the URL proxy of the content delivery platform to which the request was sent, wherein the address of the URL proxy of the content delivery system is previously stored at the digital rights server; and
providing the digital rights object from the digital rights server to the access device such that the access device can access the content by treating the digital rights object as content itself by the access device.

16. The non-transitory, computer-readable medium of claim 15, wherein the address of the URL proxy of the content delivery system to which the request was sent comprises a uniform resource locator (URL) or uniform resource identifier (URI).

17. The non-transitory, computer-readable medium of claim 15, wherein the content delivery platform is further configured to generate a business process workflow to handle the request.

18. The non-transitory, computer-readable medium of claim 17, where the business process workflow comprises a Business Process Execution Language (BPEL) script.

19. The non-transitory, computer-readable medium of claim 15, wherein the content is provided to the access device when it is purchased by the access device.

20. The non-transitory, computer-readable medium of claim 15, wherein the instructions further cause the one or more processors to:
   receive an upload of the content from a content provider; and
   determine a workflow for the content, wherein the workflow allows meta data to be combined with the digital rights, the meta data used in processing the request.

21. The non-transitory, computer-readable medium of claim 15, wherein the address is added to a header of the request.

* * * * *

UNITED STATES PATENT AND TRADEMARK OFFICE
CERTIFICATE OF CORRECTION

PATENT NO. : 9,654,456 B2  
APPLICATION NO. : 11/357652  
DATED : May 16, 2017  
INVENTOR(S) : Maes Page 1 of 1

It is certified that error appears in the above-identified patent and that said Letters Patent is hereby corrected as shown below:

In the Specification

In Column 7, Line 47, after "application)" insert -- . --.

In the Claims

In Column 11, Lines 10-11, in Claim 7, after "comprising:" delete "an access device;".

Signed and Sealed this  
Thirty-first Day of October, 2017

Joseph Matal  
*Performing the Functions and Duties of the*  
*Under Secretary of Commerce for Intellectual Property and*  
*Director of the United States Patent and Trademark Office*